United States Patent
Smith et al.

(10) Patent No.: US 12,127,603 B2
(45) Date of Patent: Oct. 29, 2024

(54) CHARGING SOLUTIONS FOR AEROSOL GENERATION DEVICE

(71) Applicant: RAI Strategic Holdings, Inc., Winston-Salem, NC (US)

(72) Inventors: Laura Smith, Winston-Salem, NC (US); Jared Aller, Winston-Salem, NC (US); Sean Lukan, Winston-Salem, NC (US); Rae McNeil, Winston-Salem, NC (US); Richard Woodard, Winston-Salem, NC (US); Benjamin Gatti, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 598 days.

(21) Appl. No.: 17/380,637

(22) Filed: Jul. 20, 2021

(65) Prior Publication Data

US 2022/0022556 A1    Jan. 27, 2022

Related U.S. Application Data

(60) Provisional application No. 63/054,455, filed on Jul. 21, 2020.

(51) Int. Cl.
*A24F 40/90* (2020.01)
*A24F 40/95* (2020.01)
(Continued)

(52) U.S. Cl.
CPC .............. *A24F 40/90* (2020.01); *A24F 40/95* (2020.01); *H02J 7/0044* (2013.01); *H02J 7/02* (2013.01);
(Continued)

(58) Field of Classification Search
CPC ........ A24F 40/90; A24F 40/95; H02J 7/0044; H02J 7/02; H02J 7/342; H02J 7/35; H02J 50/12; H02J 7/0042
See application file for complete search history.

(56) References Cited

U.S. PATENT DOCUMENTS

| | | | |
|---|---|---|---|
| 11,878,112 B2 * | 1/2024 | Alshaiba Saleh Ghannam Almazrouei | ............ A24F 40/53 |
| 2014/0224267 A1 | 8/2014 | Levitz et al. | |

(Continued)

FOREIGN PATENT DOCUMENTS

| | | |
|---|---|---|
| CN | 101867203 A | 10/2010 |
| CN | 203251962 U | 10/2013 |

(Continued)

OTHER PUBLICATIONS

International Preliminary Report on Patentability for corresponding International Application No. PCT/US2021/042568 mailed Dec. 28, 2022, all pages cited in its entirety.
(Continued)

*Primary Examiner* — Truc T Nguyen
(74) *Attorney, Agent, or Firm* — Burr & Forman LLP

(57) ABSTRACT

A charging system for charging a first battery of an aerosol generation device may include a charger having a corded connection to a power supply, and a charging case. The charging case may include a housing having a sleeve portion configured to engage a portion of the aerosol generation device, a power module disposed in the housing and configured to directly or indirectly provide power to the aerosol generation device, and a wireless charging assembly operably coupled to the housing to provide power to the power module.

23 Claims, 8 Drawing Sheets

(51) Int. Cl.
  *H02J 7/00* (2006.01)
  *H02J 7/02* (2016.01)
  *H02J 7/34* (2006.01)
  *H02J 7/35* (2006.01)
  *H02J 50/12* (2016.01)
(52) U.S. Cl.
  CPC ............... *H02J 7/342* (2020.01); *H02J 7/35* (2013.01); *H02J 50/12* (2016.02)

(56) References Cited

U.S. PATENT DOCUMENTS

| | | | |
|---|---|---|---|
| 2015/0333542 A1* | 11/2015 | Alarcon | H02J 7/007 |
| | | | 131/328 |
| 2016/0374395 A1 | 12/2016 | Jordan et al. | |
| 2017/0302324 A1 | 10/2017 | Stanimirovic et al. | |
| 2017/0347718 A1 | 12/2017 | Nakano et al. | |
| 2020/0060340 A1* | 2/2020 | Hejazi | A24F 40/42 |
| 2022/0028245 A1* | 1/2022 | Smith | G08B 21/24 |
| 2022/0312849 A1* | 10/2022 | Jackson | A24F 40/20 |

FOREIGN PATENT DOCUMENTS

| | | | | |
|---|---|---|---|---|
| CN | 203859549 | * | 10/2014 | ............. A24F 40/90 |
| CN | 210695976 U | | 6/2020 | |
| WO | WO-2015137815 A1 | * | 9/2015 | ........... A24F 47/008 |
| WO | 20190207461 A1 | | 10/2019 | |
| WO | 2020014856 A1 | | 1/2020 | |

OTHER PUBLICATIONS

International Search Report and Written Opinion from International Application No. PCT/US2021/042568 dated Nov. 4, 2021, all pages cited in its entirety.

* cited by examiner

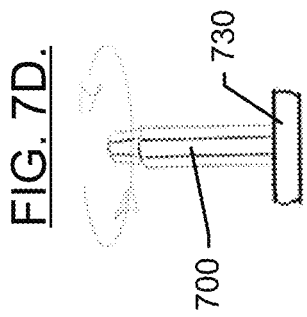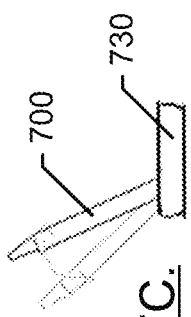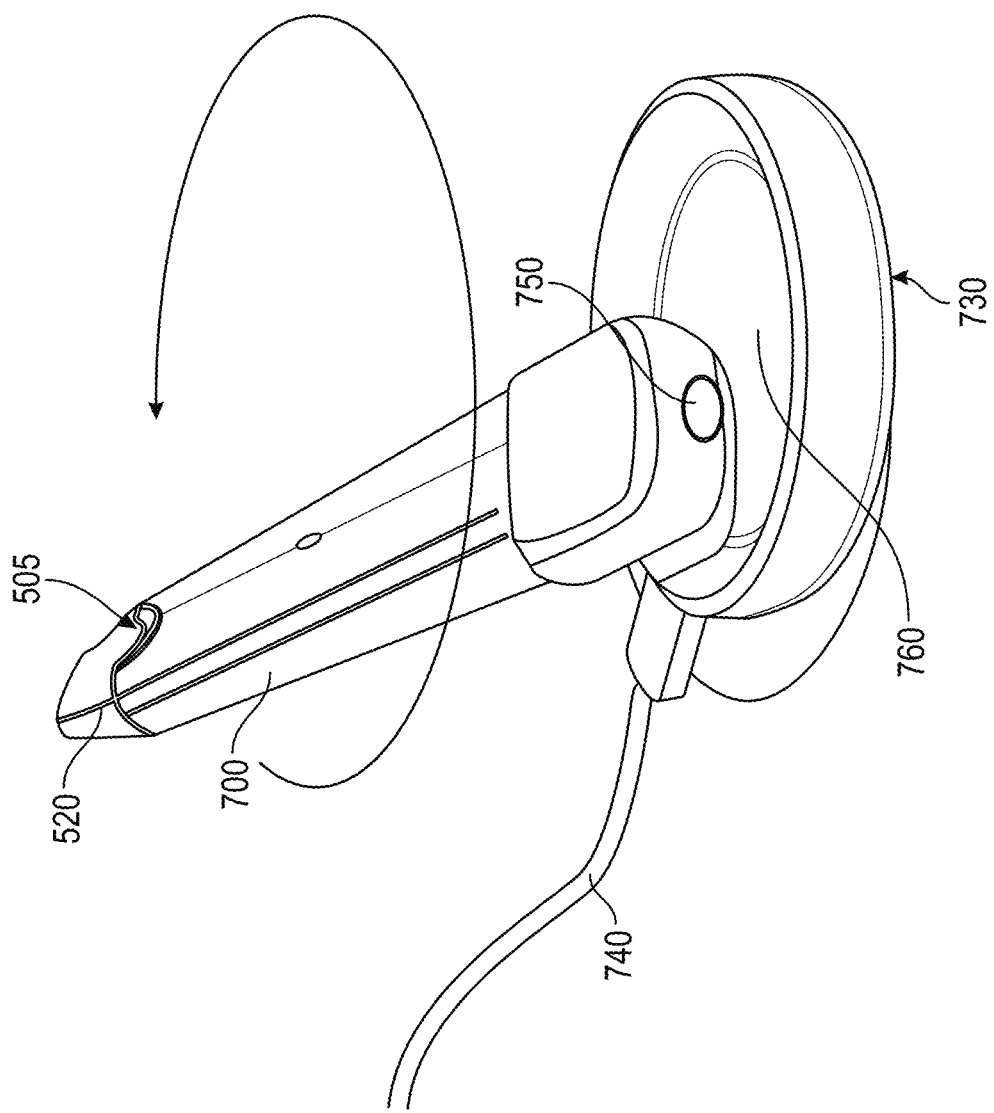

CHARGING SOLUTIONS FOR AEROSOL GENERATION DEVICE

TECHNICAL FIELD

Example embodiments generally relate to non-combustible aerosol provision systems and, in particular, relate to charging devices for use with a non-combustible aerosol provision device.

BACKGROUND

Non-combustible aerosol provision systems (e.g., e-cigarettes/tobacco heating products or other such devices) generally contain an aerosolisable material, such as a reservoir of a source liquid containing a formulation. The formulation typically includes nicotine, or a solid material such as a tobacco-based product, from which an aerosol is generated for inhalation by a user, for example through heat vaporization. However, devices including formulations with other materials, such as cannabinoids (e.g., Tetrahydrocannabinol (THC) and/or Cannabidiol (CBD)), botanicals, medicinals, caffeine, and/or other active ingredients, are also possible. Thus, a non-combustible aerosol provision system will typically include an aerosol generation chamber containing a vaporizer, e.g., a heater, arranged to vaporize a portion of the aerosolisable material to generate an aerosol in the aerosol generation chamber. As a user inhales on a mouthpiece of the device and electrical power is supplied to the heater, air is drawn into the device and into the aerosol generation chamber where the air mixes with the vaporized aerosolisable material and forms a condensation aerosol. There is a flow path between the aerosol generation chamber and an opening in the mouthpiece so the air drawn through the aerosol generation chamber continues along the flow path to an opening in the mouthpiece, carrying some of the condensation aerosol with it, and out through the opening in the mouthpiece for inhalation by the user.

Aerosol provision systems include, for example, vapor products, such as those delivering nicotine that are commonly known as "electronic cigarettes," "e-cigarettes" or electronic nicotine delivery systems (ENDS), as well as heat-not-burn products including tobacco heating products (THPs). Many of these products take the form of a system including a device and a consumable, and it is the consumable that includes the material from which the substance to be delivered originates. Typically, the device is reusable, and the consumable is single-use (although some consumables are refillable as in the case of so called "open" systems). Therefore, in many cases, the consumable is sold separately from the device, and often in a multipack. Moreover, subsystems and some individual components of devices or consumables may be sourced from specialist manufacturers.

Aerosol provision devices, like those described above, may often be powered via a rechargeable battery. Thus, it may be desirable to provide convenient and effective ways to charge the rechargeable battery.

BRIEF SUMMARY OF SOME EXAMPLES

In an example embodiment, a case or accessory for an aerosol generation device may be provided. The case may include a housing, a power module and a wireless charging assembly. The housing may include a sleeve portion configured to engage a portion of the aerosol generation device. The power module may be disposed in the housing and may be configured to directly or indirectly provide power to the aerosol generation device. The wireless charging assembly may be operably coupled to the housing to provide power to the power module.

In another example embodiment, a charging system for charging a first battery of an aerosol generation device may be provided. The charging system may include a charger having a corded connection to a power supply, and a charging case. The charging case may include a housing having a sleeve portion configured to engage a portion of the aerosol generation device, a power module disposed in the housing and configured to directly or indirectly provide power to the aerosol generation device, and a wireless charging assembly operably coupled to the housing to provide power to the power module.

It will be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 1 illustrates a general block diagram of a non-combustible aerosol provision system that may be used in connection with an example embodiment;

FIG. 2 illustrates a schematic representation of a partially cutaway view of an ENDS device that may be used in connection with an example embodiment;

Figure 5A:
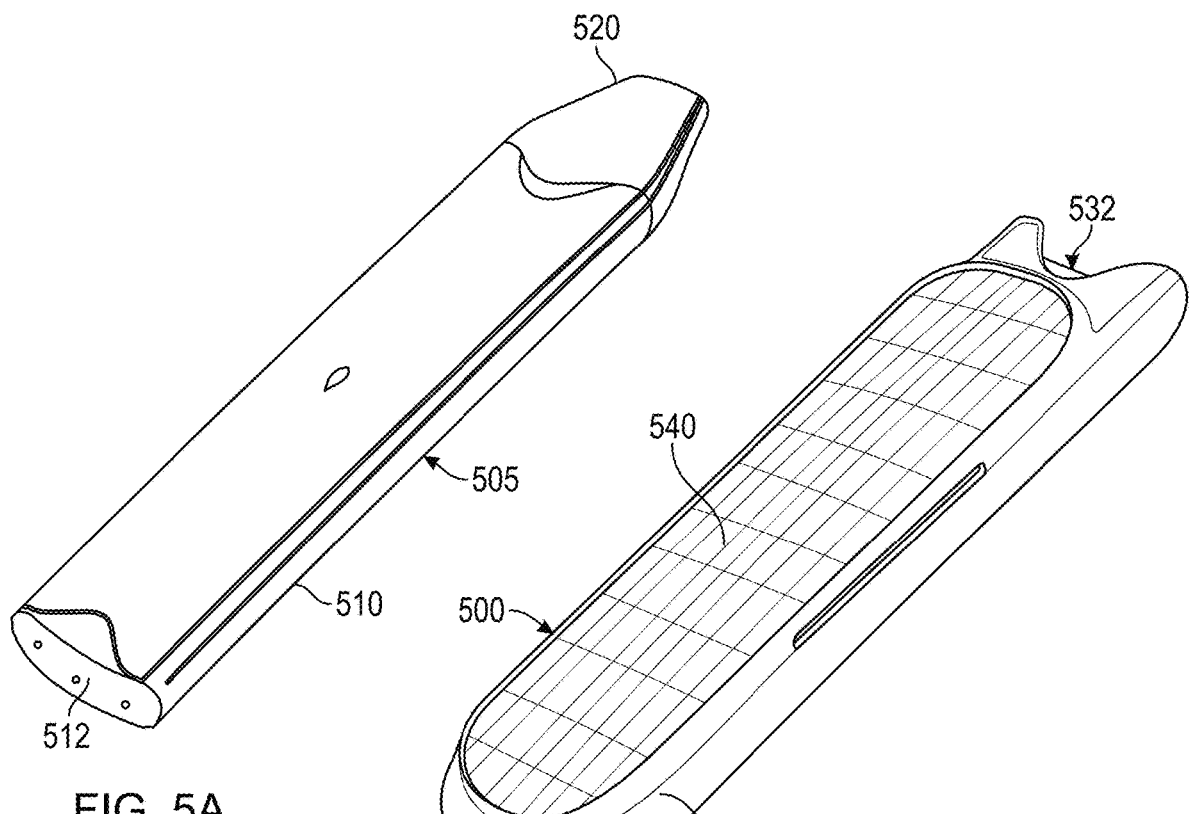
Figure 5B:
Figure 5C:
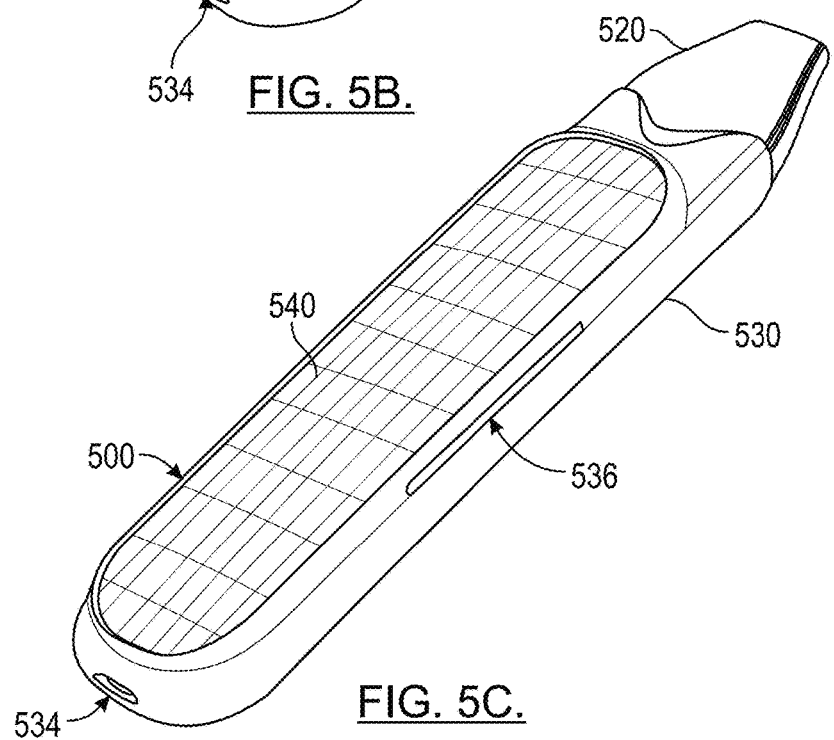
Figure 6A:
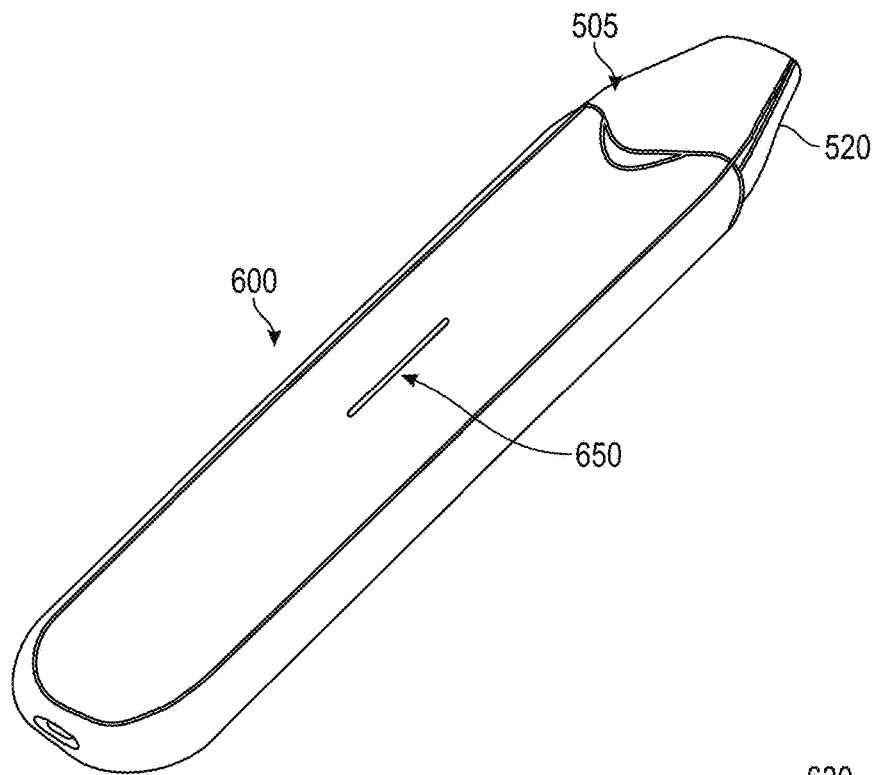
Figure 6B:
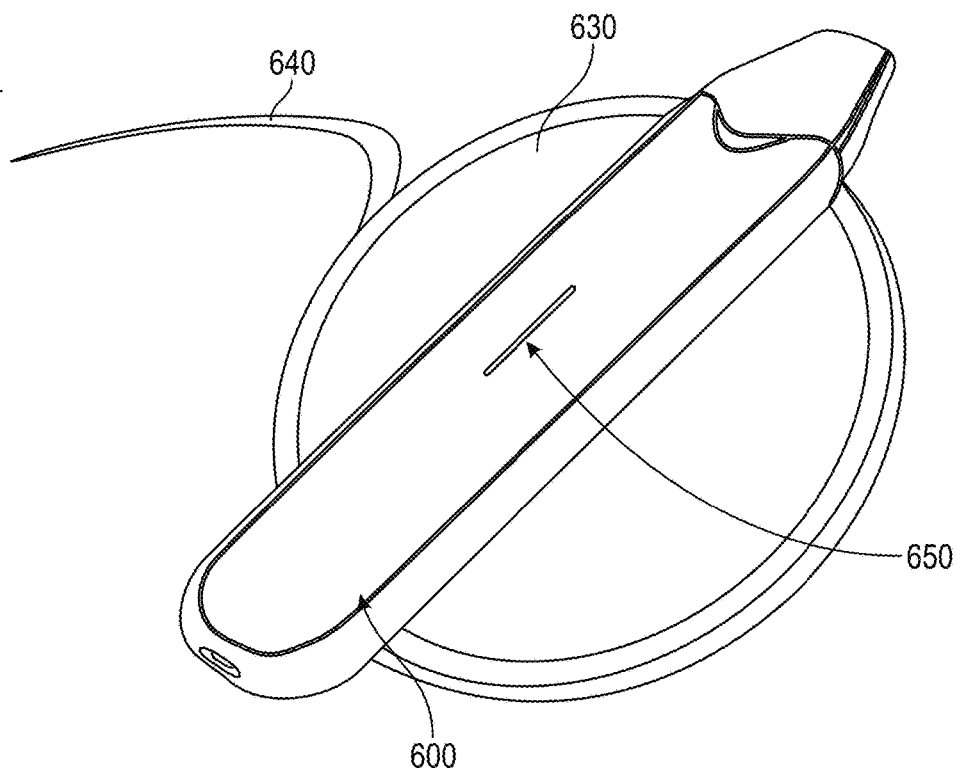
Figure 8:
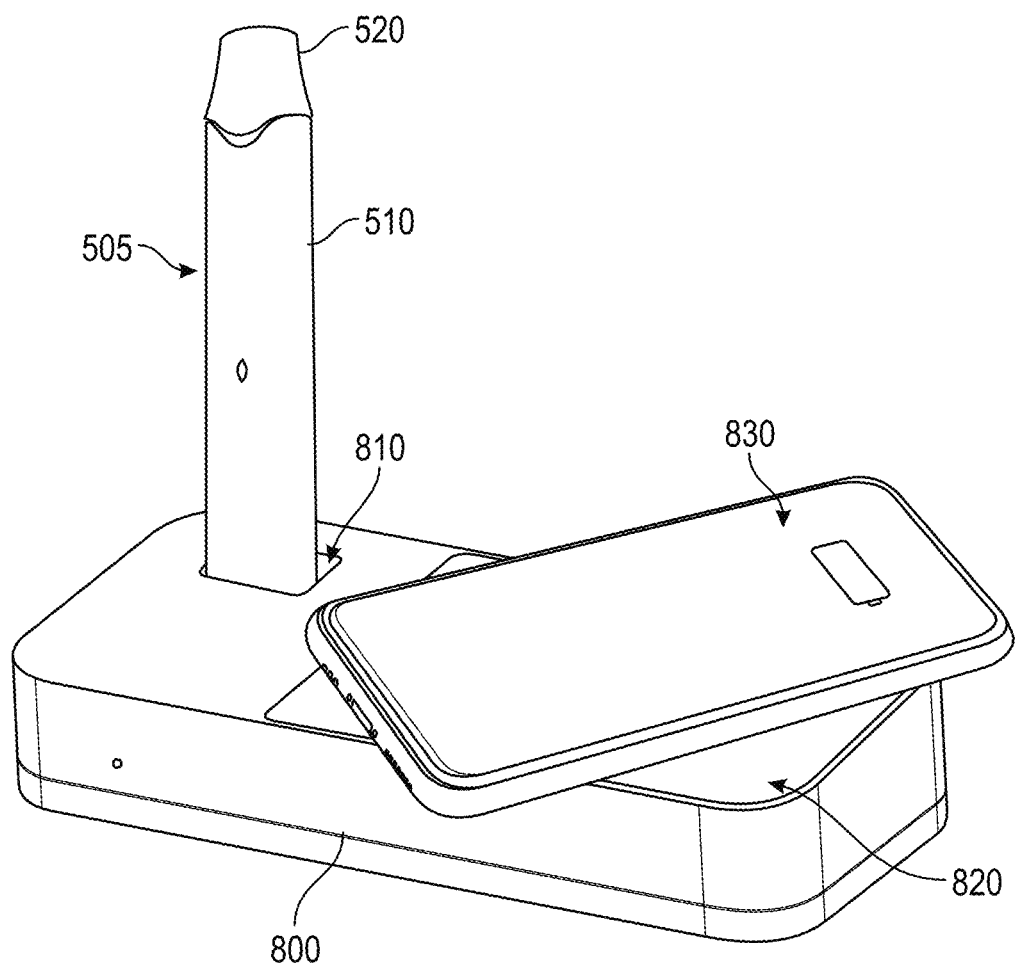
Figures 9A, 9B:
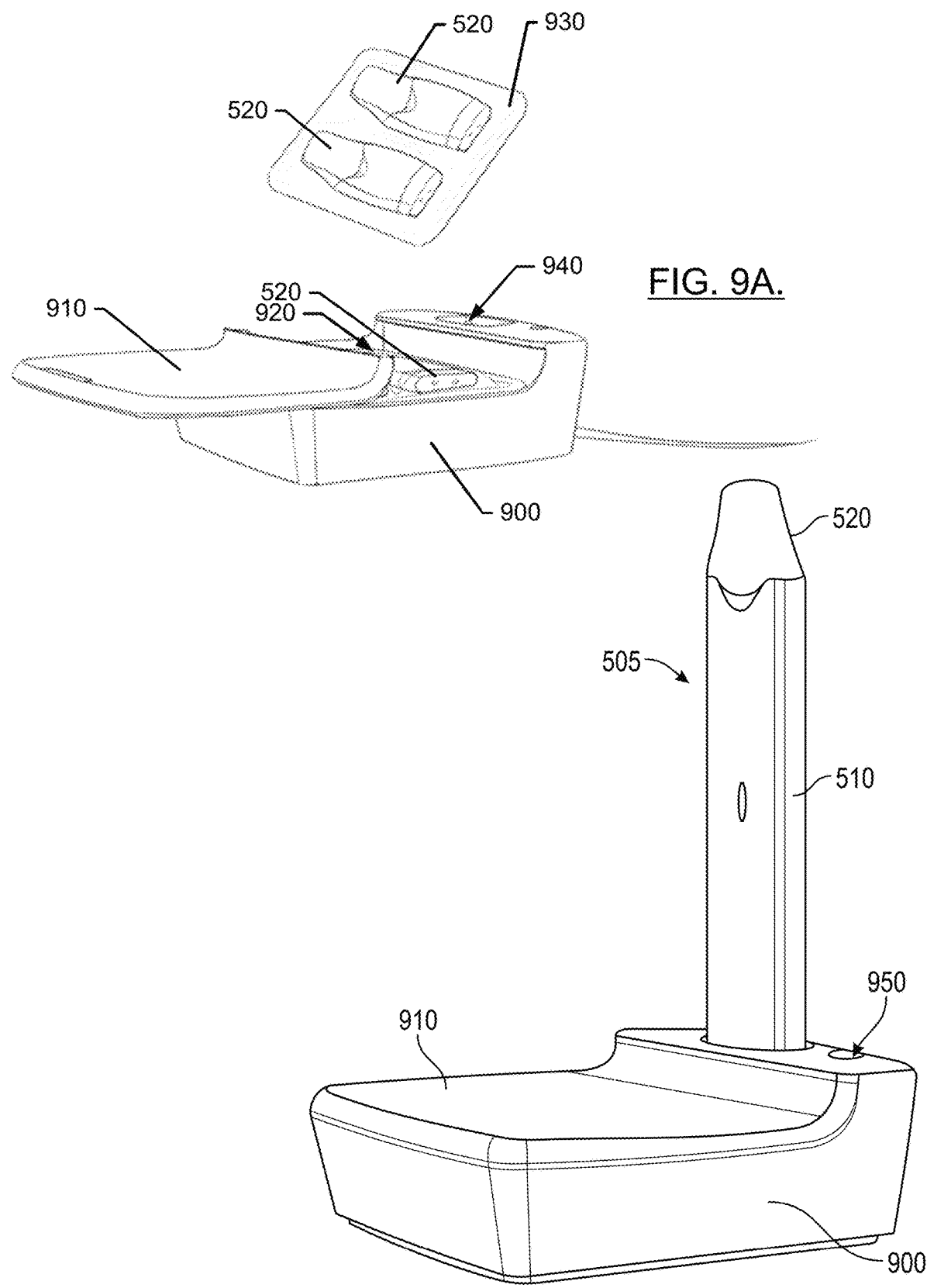

FIG. 5, which is defined by FIGS. 5A, 5B and 5C, illustrates an example of a charging case incorporating solar charging in accordance with an example embodiment;

FIG. 6, which is defined by FIGS. 6A and 6B, illustrates an example of a charging case configured to wirelessly charge via a charging pad in accordance with an example embodiment;

FIG. 7, which is defined by FIGS. 7A, 7B, 7C and 7D shows a wireless charging dish and corresponding charging case in accordance with an example embodiment;

FIG. 8 illustrates a charging base having a charging slot and a charging surface configured to charge an aerosol generation device simultaneously with charging of another device in accordance with an example embodiment; and FIG. 9, which is defined by FIGS. 9A and 9B, illustrates a charging base having a storage compartment in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, non-combustible aerosol provision systems such as an ENDS device, may be powered via battery. Taking the device out of service in order to recharge the battery can be a source of frustration for some users. Thus, it may be desirable to provide solutions to maximize the ease with which charging can be accomplished. Additionally or alternatively, it may be desirable to provide devices that are capable of extending their charge, or obtaining a charge in highly convenient circumstances. Moreover, it would be preferred, in some cases, for such solutions to be provided to existing devices so that users of such devices need not necessarily buy a new device in order to benefit from new services. Accordingly, some embodiments may provide solutions to the issues noted above and such solutions may be practiced either alone or in combination with each other. The solutions may include the provision of battery life extension and/or convenient battery charging in the form of a case that is designed to receive an aerosol generation device therein. The case may be provided with convenient battery charging capabilities and/or may have a supplemental battery for extending the life of the battery of the aerosol generation device. Such a case may give users freedom to improve or customize their devices without any need for device redesign or reconfiguration by the manufacturer. As such, for example, the costly process of evaluating design changes for marketability and/or compliance with regulatory regimes may be avoided, while still enabling users to satisfy their own respective desires for device operation and availability.

Given that example embodiments may be employed in connection with upgrading and/or improving battery life and availability of non-combustible aerosol provision systems such as ENDS devices, a general description of an example device will be provided since some aspects of the case described herein may be tailored to interface with such devices. In this regard, FIG. 1 illustrates a general block diagram of a non-combustible aerosol provision system that may be used in connection with an example embodiment. Meanwhile, FIG. 2 illustrates a schematic representation of a partially cutaway view of an ENDS device that may be used in connection with an example embodiment.

Referring first to FIG. 1, a non-combustible aerosol provision system 100 may include a housing 110 inside which a power source 120 and control circuitry 130 may be housed. The housing 110 may further include an aerosol production assembly 140 and an aerosol precursor container 150 inside which an aerosol precursor material (e.g., aerosolisable material) may be stored or contained. The housing 110 may be a single structure, or may be formed from two or more portions that are may be removable with respect to each other. For example, in an open system, the housing 110 may be a single structure with the aerosol precursor container 150 being refillable. However, for a closed system, the housing 110 may include at least one portion inside which the aerosol precursor container 150 is located, and when the aerosol precursor material is exhausted, the portion inside which the aerosol precursor container 150 is located may be removed for replacement with a new or full aerosol precursor container 150. In some examples with a removable portion inside which the aerosol precursor container 150 is located, the removable portion may be referred to as a cartridge.

The control circuitry 130 may be configured to detect or sense a puff event initiated by a user, and in response to detecting the puff event, the control circuitry 130 may actuate the aerosol production assembly 140 to transform the aerosol precursor material into an aerosol. The control circuitry 130 may therefore include a pressure sensor, a flow sensor, and/or any other suitable devices that can be configured to detect the puff event. A mouthpiece 152 defining an opening 154 in the housing 110 may be associated with the aerosol precursor container 150, and may be used by the user to initiate the puff event by inhaling at the mouthpiece 152. Accordingly, in response to the detection of the puff event, the aerosol may be produced by the aerosol production assembly 140 and delivered orally to the user via the mouthpiece 152.

The aerosol production assembly 140 may be configured to produce the aerosol from the aerosol precursor material using any suitable means. For example, the aerosol production assembly 140 may be embodied as a heat-not-burn device via which, for example, the aerosol is produced by exposing the aerosol precursor material to a heating element (e.g., an induction heater, conduction heater, dielectric heater, microwave heater, radiant heater, arc heater, electrical resistance heater, etc.). In such an example, the aerosol precursor material may be provided in a consumable that may be exposed to the aerosol production assembly 140 such that the heat thereof causes production of the aerosol from the aerosol precursor material. In some cases, the aerosol precursor material may include a substrate and/or a susceptor to facilitate the heating and aerosol release. Alternatively, in the case of a no-heat-no-burn device (e.g., a nebulizer), the aerosol production assembly 140 may be embodied as or include a vibratable piezoelectric or piezomagnetic mesh. However, compressed gas, ultrasonic waves, surface acoustic waves, and other technologies may alternatively be employed. The nebulizer may be configured to break up the aerosol precursor material into an aerosol without heating the aerosol precursor material. In other words, heat generation may or may not be involved in the operation of the aerosol production assembly 140. Moreover, in some cases, the aerosol production assembly 140 may include a combination of elements, which can include both a heating element and an additional element, such as a vibrating aerosol production component (e.g., a vibratable piezoceramic and/or other piezoelectric or piezomagnetic material) that cooperate to produce aerosol from an aerosol precursor material. Such combinations may be referred to as hybrid products.

The aerosol precursor material may be a solid, semi-solid, or liquid material. As such, the aerosol precursor container 150 may be configured to retain the aerosol precursor material in whatever form such material may take. In some cases, the aerosol precursor container 150 may be a reservoir configured to store liquid that is operably coupled to the aerosol production assembly 140 (e.g., directly or indirectly) for the generation of the aerosol as described above. In some examples, the aerosol precursor material may be provided in a substrate (e.g., coated or absorbed on/in the substrate) such that the aerosol precursor material may be integrated in, stored in, or deposited on the substrate prior to being used for generation of the aerosol.

The power source 120 may be a replaceable or rechargeable battery. Rechargeable batteries may be useful to avoid or limit production of waste materials, and to facilitate ease of operation. To facilitate recharging of the power source 120, a charge interface 122 may be provided. The charge interface 122 may include a USB (Universal Serial Bus) port or other charge port into which a charger cord or other charging device may be plugged or inserted. The charge interface 122 may therefore form a penetration or opening in the housing 110.

FIG. 2 is a cross-sectional view through one example non-combustible aerosol provision device 200 that may be implemented in connection with an example embodiment. The non-combustible aerosol provision device 200 is one more detailed example of the non-combustible aerosol provision system 100 of FIG. 1, and both may be considered to be examples of aerosol generation devices. The non-combustible aerosol provision device 200 of FIG. 2 is a two-part device (i.e., a closed system), which includes a control unit 210 and a cartridge 220. The cartridge 220 may be referred to as a consumable part (or replaceable/disposable part, and sometimes referred to as a "pod") and the control unit 210 may be referred to as a reusable part.

In normal use the control unit 210 and the cartridge 220 may be releasably coupled together at a coupling interface 230. When the cartridge 220 is exhausted or the user simply wishes to switch to a different cartridge 220 (e.g., for a different flavor), the cartridge 220 may be removed from the control unit 210 and a replacement (i.e., a different or new instance of the cartridge 220) may be attached to the control unit 210 in place of the original cartridge 220. The coupling interface 230 may provide a structural, electrical and/or air path connection between the cartridge 220 and the control unit 210, and may be established in accordance with conventional techniques, which may include a screw thread, latch mechanism, or bayonet fixing with appropriately arranged electrical contacts and openings for establishing the electrical connection and air path between the cartridge 220 and the control unit 210 as appropriate. The specific manner by which the cartridge 220 mechanically mounts to the control unit 210 is not significant to the principles described herein, but for the sake of a concrete example is assumed here to comprise a latching mechanism, for example with a portion of the cartridge 220 being received in a corresponding receptacle in the control unit 210 with cooperating latch engaging elements. It will also be appreciated the coupling interface 230 in some implementations may not support an electrical connection between the respective parts. For example, in some implementations a vaporiser may be provided in the control unit 210 rather than in the cartridge 220.

The cartridge 220 may include a consumable housing 222 (e.g., as an example of the aerosol precursor container 150 of FIG. 1). The consumable housing 222 may be formed of a plastic, composite or metallic material. The consumable housing 222 may support other components of the cartridge 220 and provide support for a portion of the mechanical coupling interface 230 with the control unit 210. The consumable housing 222 in this example is generally circularly symmetric about a longitudinal axis along which the cartridge 220 couples to the control unit 210. The consumable housing 222 of this example may have a length of about 4 cm and a diameter of around 1.5 cm. However, it will be appreciated the specific geometry, and more generally the overall shapes and materials used, may be different in different implementations.

A reservoir 224 may be provided within the consumable housing 222 to contain liquid aerosolisable material (e.g., the aerosol precursor material of FIG. 1). The aerosolisable material may be referred to as e-liquid in some examples. The liquid reservoir 224 in this example has an annular shape, though it will be appreciated that other shapes are within the scope of the disclosure, with an outer wall defined by the consumable housing 222 and an inner wall that defines an air path 226 through the cartridge 220. The reservoir 224 is closed at each end with end walls to contain the e-liquid. The reservoir 224 may be formed in accordance with conventional techniques and may, for example, be formed of a plastic material integrally molded with the consumable housing 222. The opening of the air path 226 at the end of the cartridge 220 provides a mouthpiece outlet 228 for the non-combustible aerosol provision system through which a user inhales aerosol generated by the non-combustible aerosol provision device 200 during use.

The cartridge 220 of this example may further include a wick 250 and a heater element 260 (e.g., a vaporiser) located proximate to an end of the reservoir 224 opposite to the mouthpiece outlet 228. In this example the wick 250 extends transversely across the air path 226 with ends thereof extending into the reservoir 224 of e-liquid through openings in the inner wall of the reservoir 224. The openings in the inner wall of the reservoir 224 may be sized to broadly match the dimensions of the wick 250 to provide a reasonable seal against leakage from the reservoir 224 into the air path 226 without unduly compressing the wick 250, which may be detrimental to fluid transfer performance.

The wick 250 and heater element 260 may be arranged in the air path 226 of the cartridge 220 such that a region of the air path 226 around the wick 250 and heater element 260 in effect defines a vaporisation region for the cartridge 220. E-liquid in the reservoir 224 infiltrates the wick 250 through the ends of the wick 250 that extend into the reservoir 224 and is drawn along the wick 250 by surface tension/capillary action (i.e. wicking). The heater element 260 in this example may be embodied as an electrically resistive wire coiled around the wick 250. In this example, the wick 250 may be a glass fibre bundle, but other configurations are also possible. In use, electrical power may be supplied to the heater element 260 to vaporise an amount of e-liquid (e.g., aerosolisable material) drawn to the vicinity of the heater element 260 by the wick 250. Vaporised e-liquid may then become entrained in air drawn along the air path 226 from the vaporisation region to form a condensation aerosol that exits the system through the mouthpiece outlet 228 for user inhalation. Thus electrical power can be applied to the heater element 260 to selectively generate aerosol from the e-liquid in the cartridge 220. When the device is in use and generating aerosol, the amount of power supplied to the heater element 260 may be varied, for example through pulse width and/or frequency modulation techniques, to control the temperature and/or rate of aerosol generation as desired.

The control unit 210 may include an outer housing 212 (e.g., as a portion of the housing 110 of FIG. 1) with an opening that defines an air inlet 214 for the non-combustible aerosol provision device 200. The non-combustible aerosol provision device 200 may also include, within the outer housing 212, a battery 270 for providing operating power for the non-combustible aerosol provision device 200. The battery 270 may be operably coupled to control circuitry 280 configured for controlling and monitoring the operation of the non-combustible aerosol provision device 200. The battery 270 may be an example of the power source 120, and the control circuitry 280 may be an example of the control circuitry 130 of FIG. 1.

The control circuitry 280 may be operably coupled to an inhalation sensor 282 (e.g., puff detector), which in this example comprises a pressure sensor located in a pressure sensor chamber 284. The control circuitry 280 may also be operably coupled to a visual display 286 (which may be optional). The visual display 286 may include one or more lights configured to indicate various status conditions of the non-combustible aerosol provision device 200 based on light color, flash sequences, or other indications. Alternatively or additionally, the visual display 286 may be configured to display characters, images and/or the like via a liquid crystal display (LCD) screen, one or more light emitting diodes (LEDs) or other display options. Thus, the visual display 286 may be provided to give a user a visual indication of various characteristics associated with the non-combustible aerosol provision device 200. For example, the visual display 286 may provide information indicative of current power and/or temperature setting information, remaining battery power, and so forth. As an alternative (or in addition) to the visual display 286, some example embodiments may include other means for providing a user with information relating to operating characteristics of the non-combustible aerosol provision device 200 such as, for example, using audio signalling or haptic feedback.

The control circuitry 280 may be configured to monitor the output from the inhalation sensor 282 to determine when a user is inhaling through the mouthpiece opening 228 of the cartridge 220 so that power can be automatically supplied to the heating element 260 to generate aerosol in response to user inhalation. In other implementations, as an alternative to automatic operation of the heating element 260, a button 288 may be provided instead of the inhalation sensor 282, and power may be supplied to the heating element 260 in response to a user manually activating the button 288 to trigger aerosol generation. Thus, the button 288 may also be entirely optional and omitted in some cases.

The outer housing 212 may be formed, for example, from a plastic or metallic material and may be shaped to have any desirable profile. In some examples, the outer housing 212 may be substantially cylindrical and therefore have a circular cross-section generally conforming to the shape and size of the cartridge 220 so as to provide a smooth transition between the two parts at the coupling interface 230. In some examples, the control unit 210 may have a length of around 8 cm so the overall length of the non-combustible aerosol provision device 200 when the cartridge 220 and control unit 210 are operably coupled together is around 12 cm. However, and as already noted, it will be appreciated that the overall shape and scale of components may be changed in different example embodiments without altering the principles described herein.

The air inlet 216 connects to an air path 216 through the control unit 210. The air path 216 of the control unit 210 in turn connects to the air path 226 of the cartridge 220 across the coupling interface 230 when the control unit 210 and cartridge 220 are operably coupled together. The pressure sensor chamber 284 containing the pressure sensor 282 may be in fluid communication with the air path 216 in the control unit 210 (i.e. the pressure sensor chamber 284 branches off from the air path 216 in the control unit 210). Thus, when a user inhales on the mouthpiece opening 228, there is a drop in pressure in the pressure sensor chamber 284 that may be detected by the pressure sensor 282 and also air is drawn in through the air inlet 214, along the air path 216 of the control unit 210, across the coupling interface 230, through the aerosol generation region in the vicinity of the heating element 260 (where an aerosol generated from the aerosolisable material becomes entrained in the air flow when the heating element 260 is active), along the air path 226 of the cartridge 220, and out through the mouthpiece opening 228 for user inhalation.

The battery 270 in this example is rechargeable and may be recharged via charging connector 290. In this regard, the battery 270 may be recharged through an opening in the control unit outer housing 212 at which the charging connector 290 is formed, and to which a charging plug or other charging device may be operably coupled. The charging connector 290 may take any suitable configuration including, for example, a USB connector, other standard power connectors, or even proprietary charging connections.

The control circuitry 280 may be configured or programmed to control the operation of the non-combustible aerosol provision device 200 to provide various functions thereof. The control circuitry 280 may be considered to logically comprise various sub-units or circuitry elements associated with different aspects of the operation of the non-combustible aerosol provision device 200 in accordance with the principles described herein and other conventional operating aspects of non-combustible aerosol provision devices 200, such as display driving circuitry and user input detection. It will be appreciated the functionality of the control circuitry 280 can be provided in various different ways such as, for example, using one or more suitably programmed programmable computer(s) and/or one or more suitably configured application-specific integrated circuit(s)/circuitry/chip(s)/chipset(s) configured to provide the desired functionality.

In some cases, the non-combustible aerosol provision device 200 may have three basic operating states. However, additional or different operating states are also possible. The three basic operating states may include an "off" state, an "on" state, and a "standby" state. In the off state, the non-combustible aerosol provision device 200 may unable to generate aerosol (i.e. the control circuitry 280 may prevent supplying of power to the heating element 260 in the off state). The non-combustible aerosol provision device 200 may, for example, be placed in the off state between use sessions, for example, when the non-combustible aerosol provision device 200 might be set aside or placed in a user's pocket or bag. In the on (or active) state, the non-combustible aerosol provision device 200 may be enabled to actively generate aerosol (e.g., the control circuitry 280 may provide (or enable provision of) power to the heating element 260). The non-combustible aerosol provision device 200 will thus typically be in the on state when a user is in the process of inhaling aerosol from the non-combustible aerosol provision device 200. In the standby state the non-combustible aerosol provision system may be ready to generate aerosol (e.g. ready to apply power to the heater element 260 of the illustrated embodiment) in response to user activation, but may not currently be doing so. The non-combustible aerosol provision device 200 will typically be in the standby state when a user initially exits the off state to begin a session of use (e.g., when a user initially turns on the non-combustible aerosol provision device 200), or between uses during an ongoing session of use (e.g., between puffs when the user is using the non-combustible aerosol provision device 200). It is more common for examples of the non-combustible aerosol provision device 200 using liquid aerosolisable material to revert to the standby mode between puffs, whereas non-combustible aerosol provision devices 200 using solid aerosolisable material may more often remain on between puffs to seek to maintain the aerosolisable material at a desired temperature during a session of use comprising a series of puffs.

To generate an aerosol in the non-combustible aerosol provision device 200, electrical power from the battery 270 is supplied to the heater element 260 under control of the control circuitry 280. When the non-combustible aerosol provision device 200 is on, i.e. actively generating an aerosol, power may be supplied to the heater element 260 in a pulsed fashion, for example, using a pulse width modulation (PWM) scheme to control the level of power being delivered. Thus, the power supplied to the heater element 260 during a period of aerosol generation may comprise an alternating sequence of on periods during which power is connected to the electric heater and off periods during power is not connected to the heater element 260. The cycle period for the pulse width modulation (i.e. the duration of a neighbouring pair of an off and an on period) is in this example 0.020 s (20 ms) (i.e. the pulse width modulation frequency is 50 hertz). The proportion of each cycle period during which power is being supplied to the heater (i.e. the length of the on period) as a fraction of the cycle period is the so-called duty cycle for the pulse width modulation. In accordance with certain embodiments of the disclosure, the control circuitry of the non-combustible aerosol provision system may be configured to adjust the duty cycle for the pulse width modulation to vary the power supplied to the heater, for example to achieve a target level of average power or to achieve a target temperature.

As noted above, in order to avoid changes to the designs of aerosol generation devices themselves, while still improving the overall capabilities or performance of the devices, it may be possible (and perhaps even desirable) to provide ways to improve the functionality and/or operability of the devices via other methods. Some example embodiments may address this issue by providing an improved charging case that is configured to interface with the aerosol generation device, but also improve the ability to recharge the battery and/or extend battery life. The charging case may be provided to engage and, in various embodiments, at least partially surround or enclose the aerosol generation device and add or improve battery capacity and recharging capabilities to the aerosol generation device. Thus, for example, the charging case could extend around all sides of the aerosol generation device in some cases. However, in others, the charging case may have one open side (e.g., a longitudinal end) into which the aerosol generation device may be inserted. In still other cases, the charging case may have two open sides (e.g., both longitudinal ends, thereby forming a bottomless sleeve). In still other cases, the aerosol generation device may have more than two open sides. An example of the charging case of some embodiments is shown and will be described in reference to FIG. 3. Of note, while the example of FIG. 3 will be described in reference to interface with the non-combustible aerosol provision device 200 of FIG. 2, it should be appreciated that interface is also possible on similar terms with the non-combustible aerosol provision system 100 of FIG. 1.

In an example embodiment, a charging case 300 may be configured specifically for connection to the non-combustible aerosol provision device 200 in order to retain a sleek and appealing appearance. However, the charging case 300 may further or alternatively be configured to provide additional functionality that enables enhanced charging and/or battery life for the non-combustible aerosol provision device 200. As such, when connected together, the combination of the non-combustible aerosol provision device 200 and the charging case 300 may form a functionally improved or changed version of the non-combustible aerosol provision device 200 without otherwise conducting design changes thereof.

In some example embodiments, the charging case 300 may include a housing 320 that is configured to receive and mate with or otherwise interface with the non-combustible aerosol provision device 200 in a way that securely attaches the respective devices together. In this regard, in some cases, the attachable accessory 300 may be constructed to include a sleeve portion 322 formed in the housing 320. The sleeve portion 322 may be a hollow recessed portion inside the housing 320, and may have an internal diameter and/or shape that is configured to substantially match an external diameter and/or shape of the control unit 210 (or another portion of the non-combustible aerosol provision device 200). In particular, a distal end of the control unit 210 (relative to the cartridge 220) may be configured to slide into and be received inside the sleeve portion 322 as shown by arrow 324 in FIG. 3. A diameter of the sleeve portion 322 may taper slightly as it proceeds inwardly into the housing 320 such that the control unit 210 and the sleeve portion 322 may stay in contact with each other by friction responsive to insertion of the control unit 210 into the sleeve portion 322. However, in alternative embodiments, other fixing methods (including latching mechanisms, catch members, complementary ridges/grooves, magnetic coupling and/or the like) may be employed. For example, the outer housing 212 of the control unit 210 may be metallic, or have a metallic portion or magnet thereon, and the sleeve portion 322 may include a magnet disposed to engage the control unit 210 (or the magnet or magnetic portion of the outer housing 212 of the control unit 210).

Other examples for defining the interface between the housing 320 and the non-combustible aerosol provision device 200 are also possible. For example, the housing 320 may include portions that are attached via a hinge that can be opened to allow the non-combustible aerosol provision device 200 to be inserted into the housing 320, and then closed to retain the non-combustible aerosol provision device 200 in the housing 320. The hinge may be a separate component, or may be a living hinge (i.e., formed from the same material forming the portions of the housing 320, which are joined). Another alternative example may include a case with flexible sides or portions. The sides or portions may be biased toward a closed (engagement) position, such that the sides or portions can be manipulated away from the closed (engagement) position to an open position in order to facilitate insertion of and/or engagement with the non-combustible aerosol provision device 200. When the non-combustible aerosol provision device 200 has been positioned in the housing 320, the force used to manipulate the sides or portions to the open position may be removed, and the sides or portions may release and return to the closed (engagement) position to retain the non-combustible aerosol provision device 200 in the housing 320.

The housing 320 and sleeve portion 322 may be configured to leave any desirable portions of the control unit 210 and/or the cartridge 220 exposed. In some cases, the housing 320 and the sleeve portion 322 may leave only the cartridge 220 exposed. Moreover, in some cases, only a mouthpiece of the cartridge 220 may remain exposed. By leaving the cartridge 220 exposed (i.e., not surrounded by the sleeve portion 322), the cartridge 220 may be replaceable without removing the control unit 210 from the sleeve portion 322.

Thus, for example, the sleeve portion 322 may extend along the control unit 210 as far as the coupling interface 230 (although the sleeve portion 322 may extend past the coupling interface 230, or not as far as the coupling interface 230 in alternative embodiments). Moreover, to the extent the visual display 286 and/or button 288 are included on the control unit 210, the sleeve portion 322 and the housing 320 may be configured to leave both the visual display 286 and/or button 288 exposed, or include a window or operable member (e.g., a transparent second and/or depressible section of the sleeve portion 322 aligned with the visual display 286 or the button 288) through which the visual display 286 may be viewed and/or the button 288 may be operated. Accordingly, the charging case 300 may be attached to the control unit 210 without negatively inhibiting the functionality of the non-combustible aerosol provision device 200 in any way. However, in other examples, the housing 320 may be provided with a display portion 325, and the display portion 325 may be configured to display information (e.g., state of charge) for the charging case 300.

As noted above, the battery 270 of the control unit 310 may be charged via the charging connector 290. Accordingly, in some cases, the housing 320 may have an opening 326 disposed at a distal end of the housing 320 (relative to opening that forms the sleeve portion 322) to align with the charging connector 290. The opening 326 may enable air to enter into the sleeve portion 322 (e.g., to allow the air to also enter the air inlet 214 of the control unit 210). The opening 326 may also enable a charger or charging device to interface with the charging connector 290 (either directly or indirectly). Although, direct charging of the battery 270 may be possible via the opening 326, in some cases, the opening 326 may instead interface directly with a power module 330. The power module 330 may serve as a backup, reserve, or augmented power source for the battery 270. Thus, for example, the power module 330 may be a rechargeable or replaceable battery. Moreover, in some cases, the power module 330 may be a Lithium ion battery or other battery that can provide significant power in a relatively small form factor. By providing the power module 330 as a separate power source relative to the battery 270 of the non-combustible aerosol provision device 200, the non-combustible aerosol provision device 200 may be recharged or have enhanced operability between charges due to the extended power provided by the power module 330.

Accordingly, for example, the power module 330 may be separate from the battery 270 (i.e., two respective separate battery packs or cells), and the power module 330 may provide an alternate source of power to the non-combustible aerosol provision device 200, or a source of charging power for the battery 270. In some cases, both the battery 270 and the power module 330 could be separately (and possibly even simultaneously) charged via the charging connector 290 and the opening 326, via the power module 330. In such a case, the opening 326 may be configured itself as a charge port.

In some examples, the power module 330 may power the non-combustible aerosol provision device 200 either directly or indirectly. In this regard, for direct powering, the power module 330 may provide power to the control circuitry 280 when the battery 270 is either dead or below a threshold level of charge. For indirect powering, the power module 330 may be configured to interface with the battery 270 to charge the battery 270. For example, the power module 330 may include a charging interface 334 configured to mate with the charging connector 290 of the control unit 210 when the control unit 210 is inserted into the sleeve portion 322. When the charging interface 334 is mated with the charging connector 290, the power module 330 may be operably coupled to the battery 270 to enable the battery 270 to be charged from the power module 330. Thus, for example, the power module 330 may be configured to supply a higher voltage than the battery 270 so that, when operably coupled to each other, the battery 270 may be charged.

In such an example, the control circuitry 280 operation may be unimpeded in that the control circuitry 280 may still only supply power to the heater element 260 responsive to detecting the puff event, and the power may be still supplied from the battery 270. However, the battery 270 could be charged either simultaneously or at other (i.e., non-operational) times for the heater element 260. Thus, in some cases, charging from the power module 330 to the battery 270 may only be possible when the non-combustible aerosol provision device 200 is not operating. In some cases, the power module 330 may only charge the battery 270 when the non-combustible aerosol provision device 200 in the off state. In other cases, charging from the power module 330 to the battery 270 may only be possible when the non-combustible aerosol provision device 200 is in the off state or the standby state. However, it is also possible, as noted above, for charging during the on state in some cases. In some cases, the power module 330 may be configured to receive information indicative of the state of the non-combustible aerosol provision device 200, and control charging of the battery 270 (or provision of power directly to the control circuitry 280) based on the information received. Thus, for example, charging could be stopped when the non-combustible aerosol provision device 200 is active and/or in the standby status.

When the display portion 325 is provided as a display element (e.g., one or more light emitting diodes (LEDs), an LED pipe or other charges status indicator), the display portion 325 may be operably coupled to the power module 330 to indicate a state of charge of the power module 330. For example, the display portion 325 may indicate a charge level (based on a number or color of lights lit, or how much of an LED pipe is illuminated). The display portion 325 could alternatively or additionally simply indicate whether the power module 330 is being charged or discharged.

Figure 3:
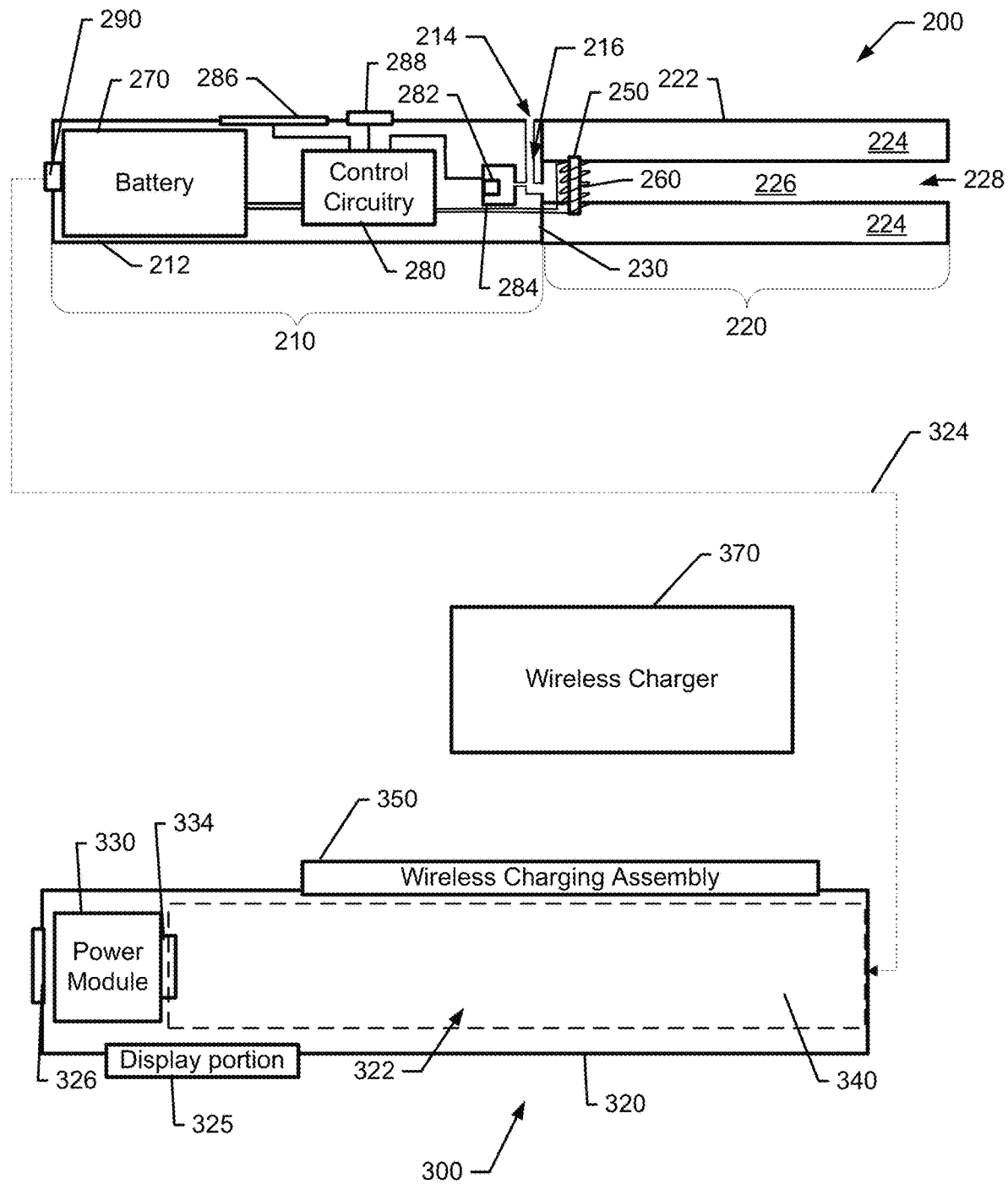
FIG. 3 is a schematic view of the device of FIG. 2 being operably coupled to a charging case to facilitate interaction with a charger in accordance with an example embodiment.

Accordingly, as can be appreciated from the example of FIG. 3, the charging case 300 may be reconfigurable to provide battery 270 charging or augmentation. In this regard, the opening 326 may be used to providing a corded charger or other charger plug to interface with the power module 330 or directly with the battery 270 of the control unit 210. However, as an alternative to the opening 326, or in addition thereto, some example embodiments may further or alternatively include a wireless charging assembly 350. The wireless charging assembly 350 may include components and circuitry configured to interface with the power module 350 to enable charging of a battery of the power module 330 or (e.g., if the power module 330 simply provides an interface to the battery 270 instead of including its own battery) to enable charging of the battery 270 of the control unit 210 (directly or indirectly) via power generated by the wireless charging assembly 350. In this regard, the wireless charging assembly 350 may be configured to receive power transmitted thereto by a wireless charger 370, which may receive power from an external power source such as a wall outlet (e.g., mains power). However, as will be noted below, the wireless charger 370 is optional and may be omitted in some cases.

As can be appreciated from the descriptions above, any of a number of wireless charging methods could be employed based on inclusion and the configuration of the wireless charging assembly 350 and wireless charger 370 (if included). For example, the wireless charging assembly 350 may include or be embodied as one or more instances of solar cells that may, when exposed to light, generate electrical power that can be used to charge the power module 330 and/or the battery 270. In such an example, there may be no need for the wireless charger 370 since power is generated locally by the solar cells and without need for an external charger. As another example, the wireless charging assembly 350 may include or be embodied antenna assemblies configured for tightly coupled electromagnetic inductive or non-radiative charging. In such examples, the wireless charger 370 may be configured to employ an antenna to transfer power to the wireless charging assembly 350 via electromagnetic inductive or non-radiative charging. In still other examples, the wireless charging assembly 350 may include or be embodied as antenna assemblies configured for or loosely coupled or radiative electromagnetic resonant charging. In such examples, the wireless charger 370 may be configured as a power source for transfer of power to the power module 330 and/or the battery 270 via loosely coupled or radiative electromagnetic resonant charging. In either case, the antenna assemblies provided as part of the wireless charging assembly 350 may interface with a charging pad or other charging device forming an example of the wireless charger 370 configured to transfer power via a loop or antenna assembly therein to the wireless charging assembly 350.

Figure 4:
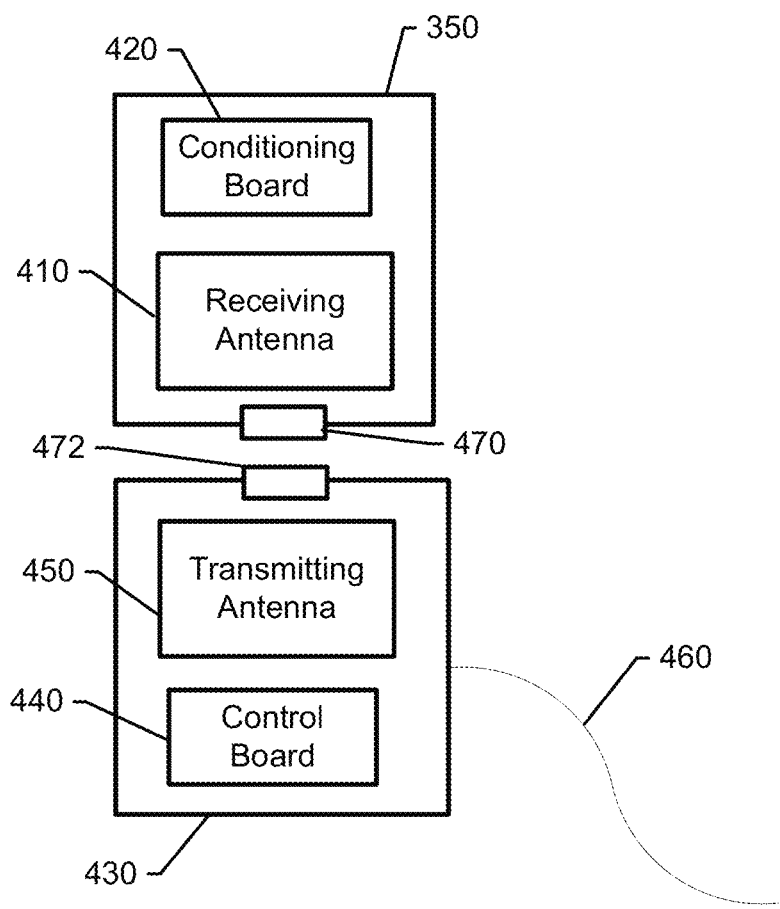
FIG. 4 illustrates a block diagram of an example implementation of a wireless charging assembly and wireless charger using electromagnetic induction or radiative electromagnetic resonant charging in accordance with an example embodiment.

FIG. 4 illustrates a block diagram of an example implementation of the wireless charging assembly 350 and wireless charger 370 that uses electromagnetic induction or radiative electromagnetic resonant charging. In this regard, the wireless charging assembly 350 may include a receiving antenna 410 (or coil). The receiving antenna 410 may be operably coupled to a conditioning board 420, which may include control circuitry and other circuitry for conditioning the power transferred to the receiving antenna into useful power for the power module 330. In this regard, for example, the conditioning board 420 may include power conversion circuitry for converting AC power at the receiving antenna 410 into DC power for the power module 330. Other conditioning and/or control functions may also be provided by the conditioning board 420 as well.

The receiving antenna 410 may, when brought in proximity thereto, communicate with a wireless charger 430 (an example of the wireless charger 370 of FIG. 3). The wireless charger 430 may include a control board 440 and a transmitting antenna 450 (or coil), along with charging cord 460. In an example embodiment, the receiving antenna 410 may be configured to receive power transferred wirelessly from the transmitting antenna 450 via the mechanisms mentioned above. The charging cord 460 may provide a connection to a power source (e.g., mains power) to provide power to the transmitting antenna 450 responsive to control and/or conditioning provided by the control board 440. In this regard, the control board 440 may include any control circuitry and/or signal conditioning circuitry needed to enable the transmitting antenna 450 to transmit power to the receiving antenna 410.

Although not required, some embodiments may further include a magnet assembly to hold the charging assembly 350 proximate to the wireless charger 430. In this regard, for example, the magnet assembly may include a first magnetic portion 470 (e.g., a magnet or metallic component that may be attracted to a magnet) disposed at the wireless charging assembly 350 and a second magnetic portion 472 (e.g., a magnet or metallic component that may be attracted to a magnet) disposed at the wireless charger 430. At least one (and sometimes both) of the first and second magnetic portions 470 and 472 may include a magnet. The first and second magnetic portions 470 and 472 may attract each other when close to each other.

As can be appreciated from the descriptions above, the charging case 300 of FIG. 3 (and implementations of the wireless charging assembly 350 of FIG. 4) may be embodied in various ways. FIG. 5, which is defined by FIGS. 5A, 5B and 5C, illustrates an example of a charging case 500, which may be an example of the charging case 300 of FIG. 3, which is specifically designed to incorporate solar charging. In this regard, the charging case 500 of FIG. 5 is configured to interface with an aerosol generation device 505 that includes a control unit 510 and cartridge 520 (which are examples of the control unit 210 and cartridge 220, respectively, described above). FIG. 5A is a perspective view of the aerosol generation device 505 and FIG. 5B is a perspective view of the charging case 500. FIG. 5C shows the aerosol generation device 505 inserted into the charging case 500.

The charging case 500 may include a housing 530 with a sleeve portion 532 and opening 534, which may correspond to the housing 320, sleeve portion 322, and opening 326, respectively, described above. The control unit 510 may include charging interface 512, which may interface directly with the opening 534 or with a power module of the charging case 500 similar to the example described above. However, the wireless charging assembly 350 of this example is embodied as a solar cell assembly or photovoltaic cell assembly 540, which may be embedded in or otherwise provided at a side of the housing 530. The photovoltaic cell assembly 540 may be capable of generating electricity responsive to exposure to solar or indoor ambient lighting.

Although the photovoltaic cell assembly 540 is only visible on one side of the housing 530 in this example, another instance of the solar cell assembly 540 may be repeated on the opposite side of the housing 530 in some cases. In some embodiments, the photovoltaic cell assembly 540 may be provided over a majority of a face of the housing 530 having the largest surface area (or both such faces if two solar cell assemblies 540 are employed). This may increase the charging potential of the charging case 500. As shown in FIG. 5, in some cases, the housing 530 may further include a charge indicator 536 at a portion thereof. However, the charge indicator 536 may be provided either at a smaller side of the housing 530 to avoid interference with the photovoltaic cell assembly 540.

FIG. 6, which is defined by FIGS. 6A and 6B, illustrates another example of a charging case 600, which may employ an example embodiment of the wireless charging assembly 350. FIG. 6A shows the charging case 600 already having the aerosol generation device 505 of FIG. 5 inserted therein (with cartridge 520 exposed). Meanwhile FIG. 6B shows the charging case 600 installed on wireless charging pad 630, which may be an example of the wireless charger 430 of FIG. 4 above (except without the magnet assembly). The wireless charging pad 630 may employ the Qi charging interface standard, or any other suitable charging technology. The wireless charging pad 630 may alternatively be replaced with a puck, mat, or other charging surface/device. As shown in FIG. 6B, the wireless charging pad 630 may be powered by cord 640 from a wall outlet or other mains power supply. In some examples, the charging case 600 of FIG. 6 may include an instance of the receiving antenna 410 of FIG. 4 disposed on a side of the charging case 600 that is opposite charge status indicator 650. The user may intuitively place the charging case 600 on the wireless charging pad 630 to leave the charge status indicator 650 visible.

FIG. 7 illustrates an example similar to that of FIG. 6 except that instead of lying flat, charging case 700 is configured to orient the aerosol generation device 505 in a normal or perpendicular orientation relative to the ground due to incorporation of a magnet assembly, such as that described above in reference to FIG. 4. In this regard, FIG. 7, which is defined by FIGS. 7A, 7B, 7C and 7D, illustrates another example of a charging case 700, which may employ an example embodiment of the wireless charging assembly 350. FIG. 7A shows the charging case 700 already having the aerosol generation device 505 of FIG. 5 inserted therein (with cartridge 520 exposed). Meanwhile FIG. 7B shows a range of locations over which the charging case 700 may be installed on wireless charging dish 730, which may be an example of the wireless charger 430 of FIG. 4 above (including the magnet assembly, as discussed below). The wireless charging dish 730 may employ the Qi charging interface standard, or any other suitable charging technology including inductive charging. As shown in FIG. 7A, the wireless charging dish 730 may be powered by cord 740 from a wall outlet or other mains power supply. In some examples, the charging case 700 of FIG. 7 may include an instance of the receiving antenna 410 of FIG. 4 disposed on the charging case 700 in a location suitable to facilitate wireless charging when the charging case 700 is placed in the wireless charging dish 730, such as on a distal end of the charging case 700 (relative to the cartridge 520 of the aerosol generation device 505). In other words, wireless charging dish 730 and charging case 700 may be configured to interface such that the placement of the charging case 700 in the wireless charging dish 730 necessarily places the charging case 700 within transmission range of the wireless charging dish 730 to facilitate charging. Moreover, the charging case 700 may have a magnet 750 (or other ferrous component) that may interface with a magnet (not shown) that is disposed under charging surface 760 of the wireless charging dish 730. The magnet 750 of the charging case 700 may interface with the magnet under the charging surface 760 (or the metal of the charging surface 760) to retain the charging case 700 in the ideal location for maximizing charge efficiency with the wireless charging dish 730. Moreover, no matter how the user sets the charging case 700 onto the charging surface 760, the magnet 750 of the charging case 700 may be drawn by the magnet under the charging surface 760 to stand the charging case 700 on end. In this regard, over any of the range of positions shown in FIG. 7B, the charging case 700 will move to be righted as shown in FIG. 7C in order to stand the charging case 700 up at the best location for charging as shown in FIG. 7D.

The wireless charging pad 630 of FIG. 6 and the wireless charging dish 730 of FIG. 7 are merely two examples of specific ways that a common charging apparatus (e.g., the wireless charger 430 of FIG. 4) may be implemented. Other ways are also possible, as shown in FIGS. 8 and 9. In this regard, FIGS. 8 and 9 each illustrate instances in which the aerosol generation device 505 of FIG. 5 is inserted into a charging apparatus with different peripheral capabilities.

In the example of FIG. 8, the aerosol generation device 505 is inserted into a charging base 800. More particularly, a charging slot 810 may be formed in the charging base 800, and a charging surface 820 may be disposed proximate to the charging slot 810. The charging slot 810 may be configured to conform to the shape of the distal end of the control unit 510 (relative to the cartridge 520), or may otherwise fit a number of different sizes and shapes of bodies of different instances of aerosol generation devices. The charging surface 820 may be configured to provide wireless charging of another device (e.g., cell phone 830) or the aerosol generation device 505 if, for example, the aerosol generation device 505 is first inserted into the charging case 600 of FIG. 6. The charging base 800 may have a cord to power the charging base 800, and may wirelessly charge the cell phone 830 while simultaneously providing a wired charge to the aerosol generation device 505. Alternatively, two (or more) instances of the aerosol generation device 505 may be simultaneously charged with one such instance being placed in the charging slot 810, and one or more other instances being disposed on the charging surface 820 (and also being disposed in respective instances of the charging case 600).

Of note, in some cases, the charging slot 810 could be configured for wireless charging as well. Thus, for example, the charging slot 810 may be configured to receive the charging case 700 of FIG. 7 and wirelessly charge the aerosol generation device 505 via the charging case 700.

FIG. 9, which is defined by FIGS. 9A and 9B, illustrates a different version of a charging base 900. In this regard, as shown in FIG. 9A, the charging base 900 may include a removable cover 910 that may expose a storage compartment 920 when removed. The storage compartment may store cartridges 520 (e.g., in a blister pack 930 or individually) and/or other consumables that may be used with an aerosol generation device, such as aerosol generation device 505, accessories for an aerosol generation device, etc. The charging base 900 of FIG. 9 may also include a charging slot 940 may be formed in the charging base 900, and a charging indicator 950 that may be disposed proximate to the charging slot 940. The charging slot 940 may be configured to provide for wired charging of the aerosol generation device 505 (similar to the charging slot 810 above). However, as also mentioned above, the charging slot 940 may alternatively be configured for wireless charging of the aerosol generation device 505 if, for example, the aerosol device 505 is first inserted into the charging case 600 of FIG. 6. The charging base 900 may have a cord 960 to power the charging base 900.

Accordingly, as can be appreciated from the examples above, a charging system for charging a first battery of an aerosol generation device may be provided. The charging system may include a charger having a corded connection to a power supply, and a charging case. The charging case may include a housing having a sleeve portion configured to engage a portion of the aerosol generation device (e.g., to retain the portion of the aerosol generation device in the housing), a power module disposed in the housing and configured to directly or indirectly provide power to the aerosol generation device, and a wireless charging assembly operably coupled to the housing to provide power to the power module.

The charging system (or the charging case (which may be considered to be an accessory in general terms) thereof) may include a number of modifications, augmentations, or optional additions, some of which are described herein. The modifications, augmentations or optional additions listed below may be added in any desirable combination. Within this context, the charging system (or charging case) may be considered a first embodiment, and other embodiments may be defined by each respective combination of modifications, augmentations or optional additions. For example, a second embodiment may be defined in which the power module may include a second battery, and the first battery may be charged from the second battery. Alternatively or additionally, a third embodiment may be defined in which the aerosol generation device may be sequentially powered from the first battery or the second battery based on a state of charge of each of the first and second batteries. In an example embodiment, a fourth embodiment may be defined in which the wireless charging assembly may include a solar cell assembly or photovoltaic cell assembly disposed on at least a portion of one or more sides of the housing. The fourth embodiment may be combined with any or all of embodiments one to three. In some examples, a fifth embodiment may be defined in which the photovoltaic cell assembly may be embedded in the side of the housing over at least a portion of (e.g., a majority of) a face of the housing having a largest surface area. The fifth embodiment may be combined with any or all of embodiments one to four. In an example embodiment, a sixth embodiment may be defined in which the charger may include a wireless charger, and the wireless charging assembly may include a receiving antenna configured to receive power transferred from a transmit antenna in the wireless charger by electromagnetic inductive or resonant power transfer. The sixth embodiment may be combined with any or all of embodiments one to five. In some examples, a seventh embodiment may be defined in which the wireless charger may include a wireless charging pad, and the receiving antenna may be disposed in a side wall of the housing such that the aerosol generation device lays flat on the wireless charging pad during the power transfer. The seventh embodiment may be combined with any or all of embodiments one to six. In an example embodiment, an eighth embodiment may be defined in which the wireless charger may include a wireless charging dish having a charging surface, and the receiving antenna may be disposed in a distal end of the housing such that the aerosol generation device is normal to the charging surface on the wireless charging dish during the power transfer. The eighth embodiment may be combined with any or all of embodiments one to seven. In some examples, a ninth embodiment may be defined in which the wireless charging dish may include a first magnetic portion disposed proximate to the charging surface of the wireless charging dish, the housing may include a second magnetic portion disposed in the distal end of the housing, and the first and second magnetic portions may interact with each other to maneuver the aerosol generation device to be normal to the charging surface responsive to placement of the housing on the wireless charging dish. The ninth embodiment may be combined with any or all of embodiments one to eight. In an example embodiment, a tenth embodiment may be defined in which the charger may include a charging slot configured to receive the aerosol generation device for charging, and the charger may further include a charging surface proximate to the charging slot. The charging surface may be configured to transfer power wirelessly to either a second instance of the charging case or another device configured to be charged wirelessly. The tenth embodiment may be combined with any or all of embodiments one to nine. In some examples, an eleventh embodiment may be defined in which the charger may include a charging slot configured to receive the aerosol generation device for charging, and a base of the charger may also include a storage compartment in which one or more cartridges of the aerosol generation device are storable. The eleventh embodiment may be combined with any or all of embodiments one to ten.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An accessory for an aerosol generation device, the accessory comprising:
   a housing comprising a sleeve portion configured to engage a portion of the aerosol generation device;
   a power module disposed in the housing and configured to directly or indirectly provide power to the aerosol generation device; and
   a wireless charging assembly operably coupled to the housing to provide power to the power module,
   wherein the sleeve portion is a hollow recessed portion inside the housing that has an internal cross-sectional profile shape configured to substantially match an external cross-sectional profile shape of the portion of the aerosol generation device.

2. The accessory of claim 1, wherein the power module includes a first battery and the aerosol generation device includes a second battery, and
   wherein the second battery is charged from the first battery.

3. The accessory of claim 1, wherein the power module includes a first battery and the aerosol generation device includes a second battery, and
   wherein the aerosol generation device is sequentially powered from the first battery or the second battery based on a state of charge of each of the first and second batteries.

4. The accessory of claim 1, wherein the wireless charging assembly comprises a photovoltaic cell assembly disposed on a surface of the housing.

5. The accessory of claim 4, wherein the photovoltaic cell assembly is embedded in the side of the housing over a majority of a face of the housing having a largest surface area.

6. An accessory for an aerosol generation device, the accessory comprising:
   a housing comprising a sleeve portion configured to engage a portion of the aerosol generation device;

a power module disposed in the housing and configured to directly or indirectly provide power to the aerosol generation device; and a wireless charging assembly operably coupled to the housing to provide power to the power module, wherein the wireless charging assembly comprises a receiving antenna configured to receive power transferred from a transmit antenna in a wireless charger by electromagnetic inductive or resonant power transfer.

7. The accessory of claim 6, wherein the wireless charger comprises a wireless charging pad, and wherein the receiving antenna is disposed in a side wall of the housing such that the aerosol generation device lays flat on the wireless charging pad during the power transfer.

8. The accessory of claim 6, wherein the wireless charger comprises a wireless charging dish having a charging surface, and wherein the receiving antenna is disposed in a distal end of the housing such that the aerosol generation device is normal to the charging surface on the wireless charging dish during the power transfer.

9. The accessory of claim 8, wherein the wireless charging dish comprises a first magnetic portion disposed proximate to the charging surface of the wireless charging dish, wherein the housing comprises a second magnetic portion disposed in the distal end of the housing, and wherein the first and second magnetic portions interact with each other to maneuver the aerosol generation device to be normal to the charging surface responsive to placement of the housing on the wireless charging dish.

10. A charging system for charging a first battery of an aerosol generation device, the charging system comprising:
a charger comprising a connection to a power supply; and
a charging case comprising:
a housing comprising a sleeve portion configured to engage a portion of the aerosol generation device;
a power module disposed in the housing and configured to directly or indirectly provide power to the aerosol generation device; and
a wireless charging assembly operably coupled to the housing to provide power to the power module,
wherein the sleeve portion is a hollow recessed portion inside the housing that has an internal cross-sectional profile shape configured to substantially match an external cross-sectional profile shape of the portion of the aerosol generation device, and
wherein an air inlet and an air outlet of the aerosol generation device remain unblocked by the sleeve portion responsive to the sleeve portion engaging the portion of the aerosol generation device.

11. The charging system of claim 10, wherein the power module includes a second battery, and
wherein the first battery is charged from the second battery.

12. The charging system of claim 10, wherein the power module includes a second battery, and
wherein the aerosol generation device is sequentially powered from the first battery or the second battery based on a state of charge of each of the first and second batteries.

13. The charging system of claim 10, wherein the wireless charging assembly comprises a photovoltaic cell assembly disposed on a side of the housing.

14. The charging system of claim 13, wherein the photovoltaic cell assembly is embedded in the side of the housing over a majority of a face of the housing having a largest surface area.

15. A charging system for charging a first battery of an aerosol generation device, the charging system comprising:
a charger comprising a connection to a power supply; and
a charging case comprising:
a housing comprising a sleeve portion configured to engage a portion of the aerosol generation device;
a power module disposed in the housing and configured to directly or indirectly provide power to the aerosol generation device; and
a wireless charging assembly operably coupled to the housing to provide power to the power module,
wherein the charger comprises a wireless charger, and
wherein the wireless charging assembly comprises a receiving antenna configured to receive power transferred from a transmit antenna in the wireless charger by electromagnetic inductive or resonant power transfer.

16. The charging system of claim 15, wherein the wireless charger comprises a wireless charging pad, and wherein the receiving antenna is disposed in a side wall of the housing such that the aerosol generation device lays flat on the wireless charging pad during the power transfer.

17. The charging system of claim 15, wherein the wireless charger comprises a wireless charging dish having a charging surface, and wherein the receiving antenna is disposed in a distal end of the housing such that the aerosol generation device is normal to the charging surface on the wireless charging dish during the power transfer.

18. The charging system of claim 17, wherein the wireless charging dish comprises a first magnetic portion disposed proximate to the charging surface of the wireless charging dish,
wherein the housing comprises a second magnetic portion disposed in the distal end of the housing, and
wherein the first and second magnetic portions interact with each other to maneuver the aerosol generation device to be normal to the charging surface responsive to placement of the housing on the wireless charging dish.

19. A charging system for charging a first battery of an aerosol generation device, the charging system comprising:
a charger comprising a connection to a power supply; and
a charging case comprising:
a housing comprising a sleeve portion configured to engage a portion of the aerosol generation device;
a power module disposed in the housing and configured to directly or indirectly provide power to the aerosol generation device; and
a wireless charging assembly operably coupled to the housing to provide power to the power module,
wherein the charger comprises a charging slot configured to receive at least a portion of the aerosol generation device for charging, and
wherein the charger further comprises a charging surface proximate to the charging slot, the charging surface being configured to transfer power wirelessly to either a second instance of the charging case or another device configured to be charged wirelessly.

20. A charging system for charging a first battery of an aerosol generation device, the charging system comprising:
a charger comprising a connection to a power supply; and
a charging case comprising:
a housing comprising a sleeve portion configured to engage a portion of the aerosol generation device;
a power module disposed in the housing and configured to directly or indirectly provide power to the aerosol generation device; and a wireless charging assembly operably coupled to the housing to provide power to the power module, wherein the charger comprises a charging slot configured to receive at least a portion of the aerosol generation device for charging, and wherein a base of the charger comprises a storage compartment in which one or more cartridges of the aerosol generation device are storable.

21. The accessory of claim 1, wherein a length of the sleeve portion is at least equal to a length of a control unit of the aerosol generation device such that a majority of the aerosol generation device is received in the sleeve portion.

22. The accessory of claim 1, wherein a length of the sleeve portion is less than a length of a control unit of the aerosol generation device such that a majority of the aerosol generation device extends out of the sleeve portion.

23. The accessory of claim 1, wherein the sleeve portion comprises a first magnet that interfaces with a second magnet disposed at the wireless charging assembly to retain the aerosol generation device in a position that maximizes charging efficiency.

* * * * *